(12) United States Patent
Kobayakawa

(10) Patent No.: US 6,947,718 B2
(45) Date of Patent: Sep. 20, 2005

(54) DEVIATION COMPENSATION APPARATUS

(75) Inventor: Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 571 days.

(21) Appl. No.: 10/072,270

(22) Filed: Feb. 6, 2002

(65) Prior Publication Data

US 2002/0163977 A1 Nov. 7, 2002

(51) Int. Cl.$^7$ .............................. H04B 1/10; H04B 7/015
(52) U.S. Cl. ...................... 455/306; 455/137; 455/303; 455/305; 455/504; 455/276.1
(58) Field of Search ................................. 455/137, 272, 455/276.1, 278.1, 303, 305, 501, 504, 506, 562.1, 63.1, 65, 273; 375/349

(56) References Cited

U.S. PATENT DOCUMENTS

| | | | | |
|---|---|---|---|---|
| 3,681,695 A | * | 8/1972 | Cease et al. ................. | 455/137 |
| 3,965,422 A | * | 6/1976 | Tagliaferri .................. | 455/138 |
| 4,266,296 A | * | 5/1981 | Ishigaki ...................... | 455/303 |
| 6,026,115 A | * | 2/2000 | Higashi et al. ............. | 375/148 |
| 6,058,318 A | * | 5/2000 | Kobayakawa et al. ... | 455/562.1 |
| 6,085,104 A | * | 7/2000 | Kowalski et al. ........... | 455/506 |
| 6,654,618 B2 | * | 11/2003 | Kobayakawa ............... | 375/347 |

OTHER PUBLICATIONS

Miura, et al. A Calibration Method for DBF Receiving Array Antenna by Using Maximal–Ratio–Combining Weights. Technical Report of IEICE A P.97–96.
Oodo, et al. A Remote Calibration Method for DBF Transmitting Array Antenna by Using Synchronous Orthogonal Code. Communications Research Laboratory, MPT pp. 1–4.

* cited by examiner

Primary Examiner—Simon Nguyen
(74) Attorney, Agent, or Firm—Katten Muchin Zavis Rosenman

(57) ABSTRACT

A compensating part compensates for deviations on transmission paths, and a pre-deviation signal combining part or a post-deviation signal combining part combines signals on the transmission paths before or after having the deviations applied thereto, wherein the compensating part performs compensation for the deviations based on output of the pre-deviation signal combining part or post-deviation signal combining part and the signals on the transmission paths to be compensated.

16 Claims, 15 Drawing Sheets

DEVIATION COMPENSATION APPARATUS

BACKGROUND OF THE INVENTION

1. Field of the Invention

The present invention relates to a deviation compensation apparatus, and, in particular, to a deviation compensation apparatus compensating for at least one of amplitude deviation and phase deviation.

2. The Description of the Related Art

In recent years, a cellular mobile communication system in which a plurality of antenna elements (a multi-beam antenna, adaptive array antenna, etc.) are provided in a radio base station, and digital signal processing is performed on signals transmitted/received therethrough attracts attention.

When such a system employing a multi-beam antenna, adaptive array antenna system, or the like accompanied by digital signal processing is applied to a radio base station of a cellular mobile communication system, it is possible to equivalently sharpen a beam pattern so as to improve the gain, and, also, to reduce interference within the area due to the directivity thereof. As a result, the number of users which can be accommodated by one cell can be effectively increased.

However, in order to attain a beam forming system by signal processing in a digital domain, at a reception side, a low noise amplifier (LNA), a mixer for frequency conversion, etc. are needed in a process of converting a radio frequency signal (RF signal) received by each antenna into a baseband frequency signal. Moreover, also at a transmission side, nonlinear devices such as a frequency converter which carries out frequency conversion from the baseband frequency to the RF frequency, an RF high power amplifier (HPA), etc. are needed for each antenna branch. When a amplitude deviation and/or phase deviation occurs on these nonlinear elements independently for each antenna branch, efficient beam forming may not be performed, and degradation in the characteristic may occur.

Furthermore, for an up-link circuit (circuit from a mobile station to a radio base station), the phase on each antenna branch includes the phase between each antenna determined by directions from which user signals is incident in the communication area (cell or sector) to which the antenna is directed to and the arrangement of antennas of the base station. Accordingly, only the phase deviation should be compensated for while the phase difference information needed for array combination processing of each antenna reception signal should be maintained.

Furthermore, also in a down-link circuit (circuit from the radio base station to the mobile station), a weight is given for a signal provided to each antenna normally in the baseband for beam forming, and radiation should be made from the respective antennas while the weighting condition should be maintained. Therefore, only the phase deviation should be compensated for while the weighting condition should be maintained. Thus, compensation for amplitude and phase deviation is an extremely important matter for introducing such a system on multi-beam antenna or adaptive array antenna.

FIG. 1 shows an outline view of a configuration of a system which employs an adaptive array antenna. This figure shows a configuration of a receiving part. An LNA(s) (low noise amplifiers) $102a$ through $102d$, frequency converters $103$ and $105$, amplifiers $104a$ through $104d$, A/D converters $106a$ through $106d$, multipliers $107a$ through $107d$, and a combining part $108$ are provided for a plurality of antennas $101a$ through $101d$. The frequency converters $103$ and $105$ include an LO (local oscillators) and mixers.

From the LNA $102a$, a signal received by the antenna $101a$ is output at low noise and high gain, and is converted into an intermediate frequency signal (IF signal) from the RF signal by the frequency converter $103$. Then, after the IF signal amplified by the amplifier $104a$ is converted into a baseband signal by the frequency converter $105$, it is converted into a digital signal by the A/D converter $106a$, and is weighted by a weight W through the multiplier $107a$. The same processing is performed also for the antennas $101b$ through $101d$. The thus-weighted signals are combined by the combining part $108$. The reception signal is expressed by a complex number having parameters of an amplitude 'a' and a phase $\theta$. Similarly, a transmission signal is expressed by a complex number having parameters of an amplitude 'a' and a phase $\theta$.

When the radio frequency signal is received from the incident direction $\phi$ shown in FIG. 1 to the antennas $101a$ through $101d$, a phase difference based on difference in transmission path occurs in the reception signal. With respect to the antenna $101a$, as shown in FIG. 1, for the antennas $101b$ through $101d$, the transmission path differences A1 through A3, occurs, respectively, for example. For example, by setting the weights W such as to cancel these transmission-path differences by the multipliers $107a$ through $107d$, and, the combining part $108$ combines them, a beam pattern B1 as shown in FIG. 2 can be obtained as a beam pattern of this adaptive array antenna.

Generally speaking, the directivity of the adaptive array antenna can be set such as to have a strong directivity for a desired signal direction, and have nulls for non-specific interference directions. The beam pattern B1 obtained by such an adaptive array antenna is compared with a beam pattern B2 obtained by a single antenna receiving a signal, by using FIG. 2. Assuming that an incoming direction of a signal on a desired user is $\phi$, an incoming direction of a signal on an interference user is $\eta$, and the signal levels on the desired user signal and interference user signal received by the respective beam patterns are P1, P2, and P3, P4. As a result, although there is no significant level difference La between P3 and P4 by the beam pattern B2, the level difference Lb between P1 and P2 is remarkably large by the beam pattern B1. Thereby, it is possible to improve the SIR.

Moreover, when the above-described system performs beam forming, as shown in FIG. 1, on reception, in order to convert the RF signals received by the respective antennas $101a$ through $101d$ into the baseband signals, the nonlinear devices such as the LNAs $102a$ through $102d$ and the mixers are needed. Moreover, although not shown in the figure, also on transmission, nonlinear elements which carry out frequency conversion of the baseband signals to the RF signals, such as frequency converter and HPA for RF signal, are needed for each antenna branch.

For this reason, generally speaking, a method of performing calibration between the respective antenna branches periodically (once a day, or the like) is performed according to the related art.

However, in case the amplitude and phase deviation occurs dynamically, beam forming is performed on indefinite phase conditions, and thus, the reliability of the system may not be maintained at a sufficiently high level. As a scheme of solving this problem, an article "A Calibration Method for DFB Receiving Array Antenna by Using Maximum-Ratio-Combining Weight", Technical Report of IEICE (Institute of Electronics, Information and Communication Engineers), AP97-96, discloses to a method to be applied to an up-link array antenna system, and, also, another article "A Remote Calibration Method for DBF Transmitting Array Antenna by Using Synchronous Orthogonal Code", Communication Society, IEICE, SB-1-17, 1998, discloses a method to be applied to a down-link array antenna system.

However, in up-link case, in order to extract the amplitude and the phase deviation occurring between respective branches, a certain signal should be transmitted from a known direction into a cell or a sector. In down-link case, known signals are needed on both transmission and reception ends, an orthogonal multi-beam should be used for transmission and, also, a deviation signal should be informed to the transmission source.

Moreover, in the related art, there are restrictions in layout of hardware, spaces, etc., and, in case deviation compensation processing is needed on every functional block, many signal wires which go back and forth between the processing blocks of each branch are needed, and, thus, as a result of arrangement of signal bus lines becoming complicated, it may become disadvantageous in respect of cost and/or reliability.

Moreover, in the related art, as deviation compensation processing is performed on each hardware functional block, a circuit configuration may become complicated in case the deviation compensation is processed for a different carrier frequency in order to reduce the number of signal lines disposed.

For example, in FIG. 3, amplitude and phase deviation compensation blocks 4a and 4b are blocks which perform amplitude and phase deviation compensation on the nonlinear elements $3_1$ through $3_4$, and, branching parts 1a and 1b, combining parts 2a and 2b, and circuits 5a and 5b are provided for respective transmission paths. Thus, the circuit configuration becomes complicated.

SUMMARY OF THE INVENTION

The present invention has been devised in view of the above-mentioned problems, and an object of the present invention is to provide a deviation compensation apparatus which does not need known information, and, by which, even in case processing of respective branches is divided into a plurality of blocks, it is possible to flexibly adapt the circuit configuration to restriction in hardware.

A deviation compensation apparatus according to the present invention compensating for at least one of an amplitude deviation and a phase deviation occurring in signals during transmission thereof through N transmission paths, where N denotes a natural number larger than 1, includes:

a compensating part compensating for deviations on M transmission paths of the N transmission paths, where M is a natural number and M<N; and a pre-deviation signal combining part combing signals on the N transmission paths before having deviations applied thereto, wherein the compensating part performs compensation for the deviations based on output of the pre-deviation signal combining part and the signals on the transmission paths to be compensated.

Another deviation compensation apparatus according to the present invention compensating for at least one of an amplitude deviation and a phase deviation occurring in signals during transmission thereof through N transmission paths, where N denotes a natural number larger than 1, includes:

a compensating part compensating for deviations on M transmission paths of the N transmission paths, where M is a natural number and M<N; and a post-deviation signal combining part combing signals on the N transmission paths after having deviations applied thereto, wherein the compensating part performs compensation for the deviations based on output of the pre-deviation signal combining part and the signals on the transmission paths to be compensated.

Thereby, the deviation compensation apparatus does not need known information, and, also, can flexibly be adapted to restrictions in hardware.

The compensating part may compensate for the deviations based on the output of the pre-deviation signal combining part, a combination of the signals on the transmission paths to be compensated and the signals on the transmission paths to be compensated after having the deviations applied thereto.

Another deviation compensation apparatus according to the present invention compensating for at least one of an amplitude deviation and a phase deviation occurring in signals during transmission thereof through N transmission paths, where N denotes a natural number larger than 1, includes:

a compensating part compensating for deviations on M transmission paths of the N transmission paths, where M is a natural number and M<N; and a post-deviation signal combining part combing signals on the N transmission paths after having the deviations applied thereto, wherein the compensating part performs compensation for the deviations based on output of the post-deviation signal combining part and the signals on the transmission paths to be compensated.

The compensating part may compensate for the deviations based on the output of the post-deviation signal combining part, a combination of the signals on the transmission paths to be compensated and the signals on the transmission paths to be compensated before having the deviations applied thereto.

The deviation compensation apparatus may further comprise:

a correction value calculating part calculating a correction value every predetermined interval for each transmission path, wherein:

the correction value calculating part performs processing of calculating an average for a second predetermined interval of a product of an error signal of a difference between the output of the pre-deviation signal combining part or post-deviation signal combining part and a combination signal of the signals on the transmission paths to be compensated, and the signal on each transmission path to be compensated.

Thereby, the components other than the desired signals included in a reference signal can be substantially removed off, and, thus, by using the reference signal including the components other than the desired signals, the deviations can be compensated for properly.

The deviation compensation apparatus may further include a first circuit of multiplying with an amplitude and a phase rotation, and a second circuit of performing conversion reverse to that of the first circuit, for at least each transmission path to be compensated.

Thereby, it is possible that a combining part performs a combining method other than a combining method of uniform amplitude, flexibly.

The deviation compensation apparatus may be used for radio communication employing a plurality of carrier frequencies, and in such a case, the apparatus may further comprise an amplifier covering a frequency band used by the radio communication, a circuit selecting each carrier frequency, and a frequency converting circuit converting each carrier frequency into a baseband frequency.

Thus, even for radio communication employing different carrier frequencies, amplitude and phase deviation compensation can be attained by a simple configuration.

Thus, according to the present invention, the deviation can be effectively reduced from RF parts by the deviation compensation apparatus for up-link communication case, the signals on the respective transmission paths before having deviations applied thereto are combined so as to obtain the reference signal, and, even when the amplitude and phase deviation compensation blocks for the signals after having the deviations applied thereto may be divided due to restrictions in hardware, the blocks are combined appropriately so that wiring between functional blocks may be effectively reduced. For down-link communication case, signals on each combination of transmission paths are combined so as to obtain the reference signal for the purpose of adjusting to restrictions in hardware, and, the signals after having the deviations applied thereto are combined for the purpose of minimizing the RF parts, and the combination signal is provided to an adaptive processing part. Then, the deviation correction values used for compensating for the amplitude and phase deviations are calculated by every-time processing such as MMSE by using the thus-obtained signals and respective branch signals.

Thereby, the configuration of the apparatus can be flexibly changed adaptively so as to mach the restrictions in hardware and carrier frequency processing, the deviations even changing dynamically can be properly and real-time compensated for. Also, the reliability on the adaptive processing employing the signals obtained after the deviations are compensated for is thus improved. Accordingly, it is possible to perform beam forming for both up-link case and down-link case effectively. Thus, the present invention can greatly contribute to development for a cellular mobile radio base station employing a multi-beam antenna or an adaptive array antenna in a digital domain.

BRIEF DESCRIPTION OF THE DRAWINGS

Other objects and further features of the present invention will become more apparent from the following detailed description when read in conjunction with the following accompanying drawings.

DESCRIPTION OF THE PREFERRED EMBODIMENTS

Figure 1:
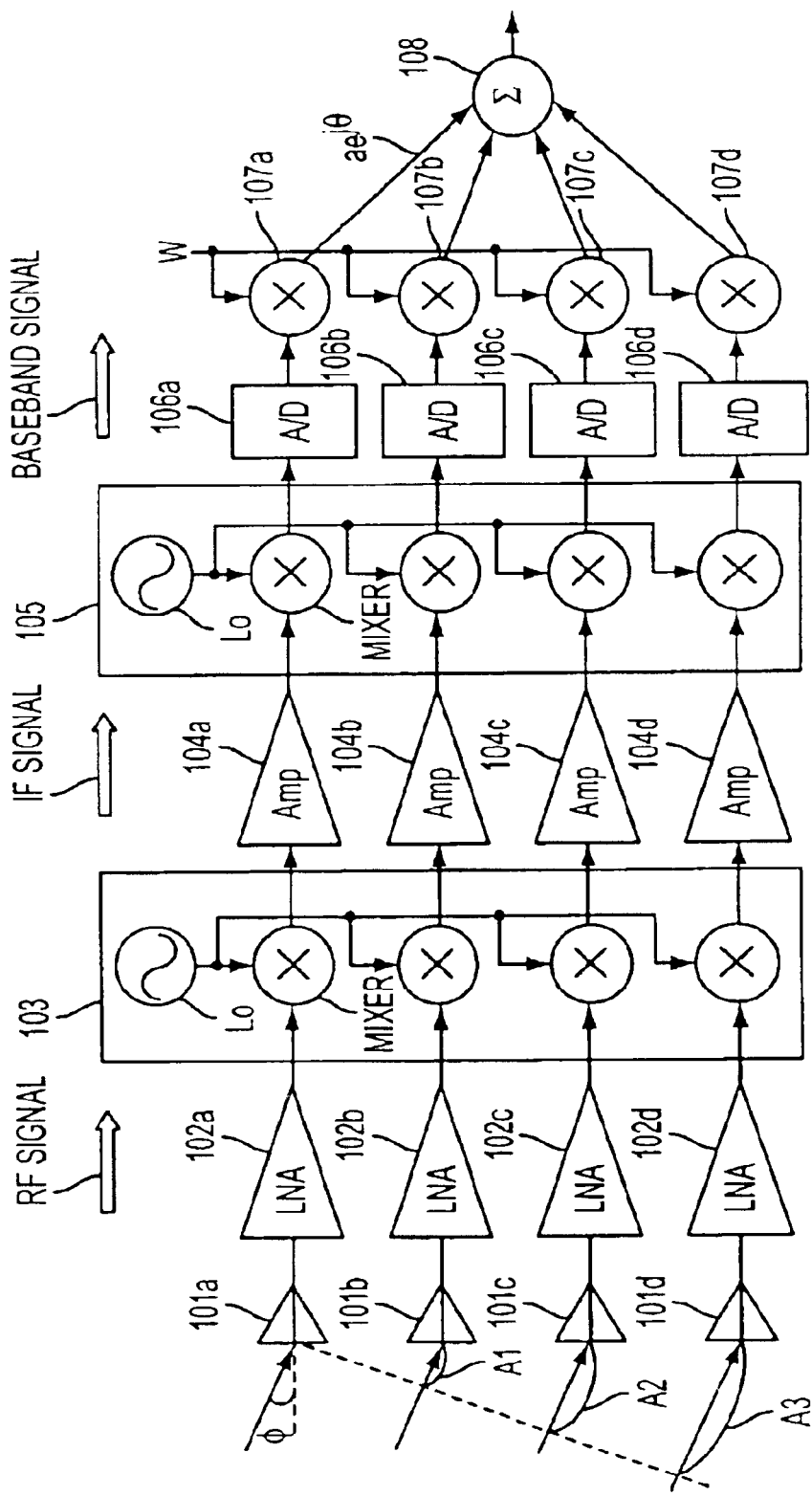
FIG. 1 illustrates a system employing an adaptive array antenna.
Figure 2:
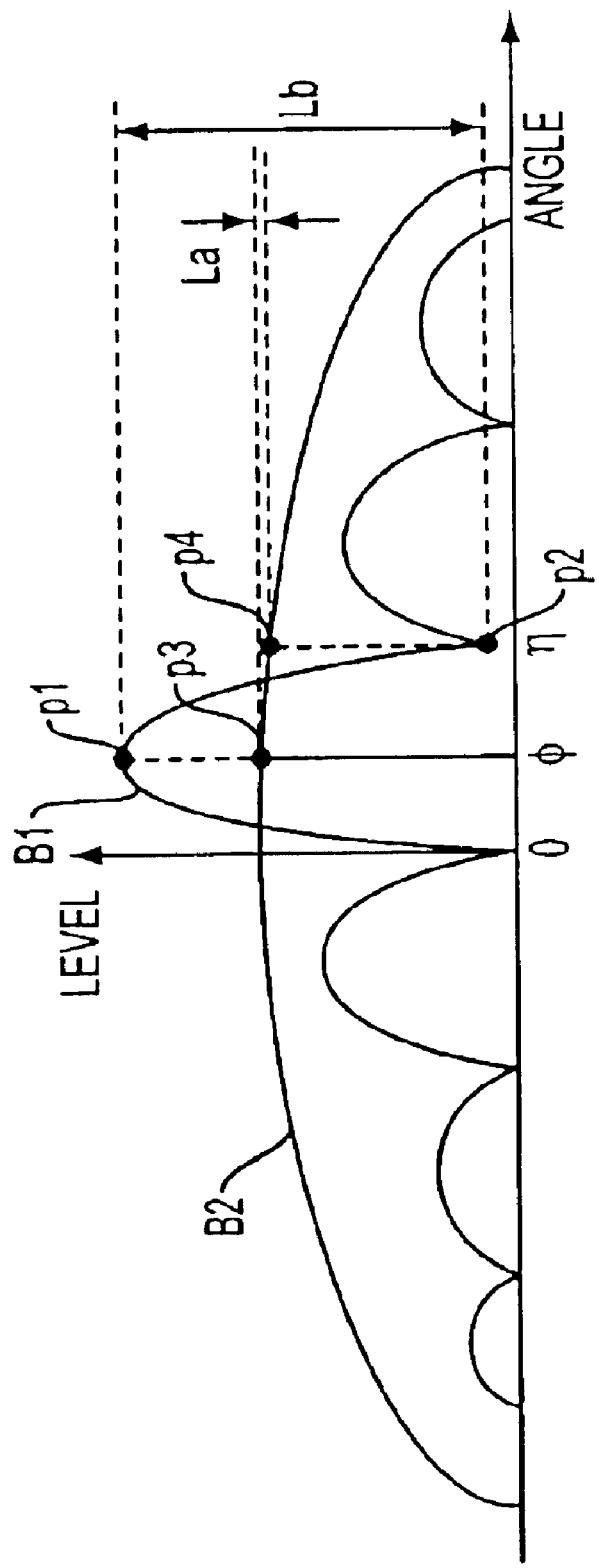
FIG. 2 illustrates a beam pattern of the array antenna.
Figure 3:
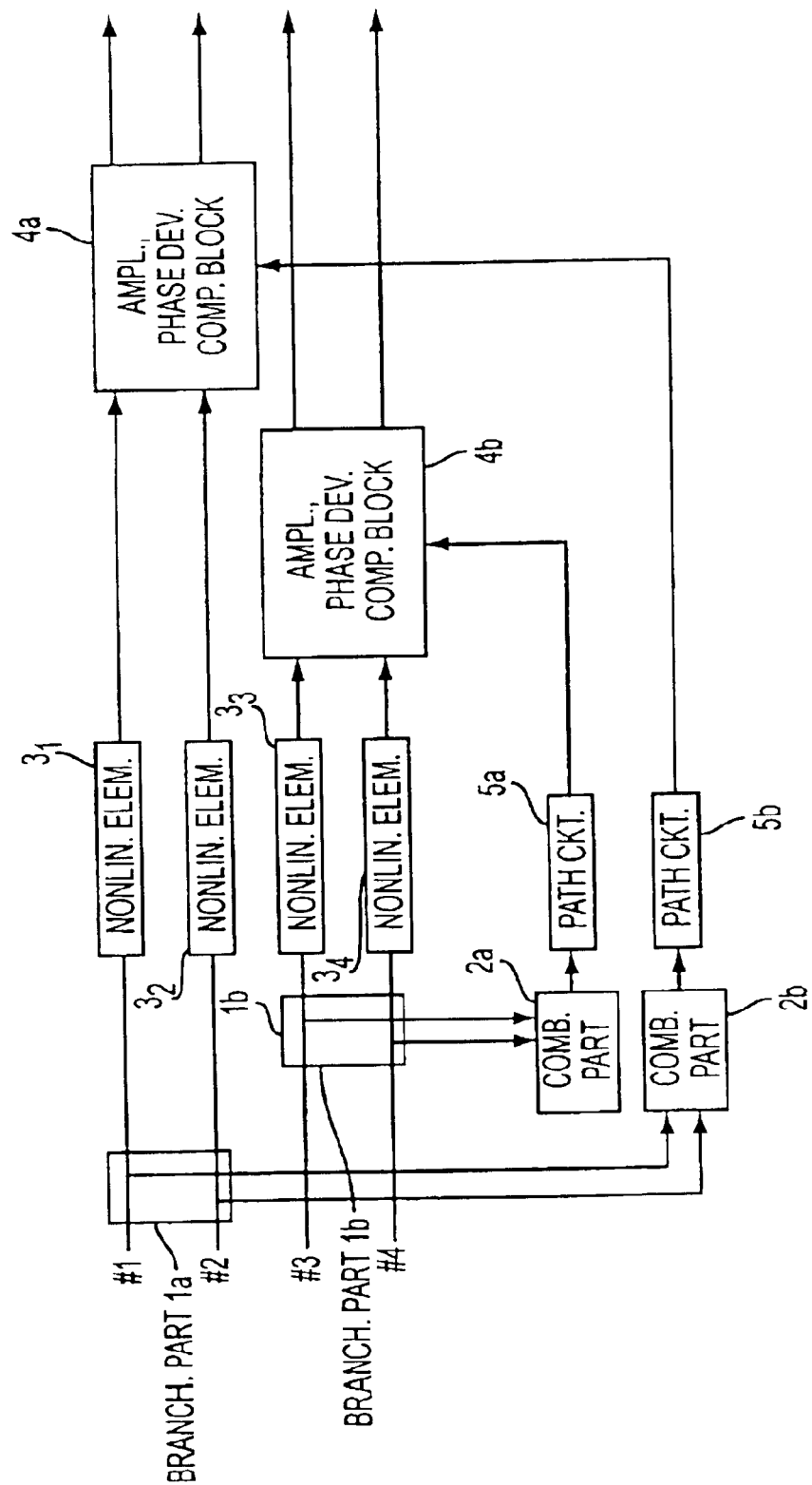
FIG. 3 illustrates deviation compensation in the related art in case processing on respective branches is divided.

Preferable embodiments of the present invention will now be described.

First, a deviation compensation apparatus which does not need known information will now be described with reference to FIG. 4.

A deviation compensation apparatus 100 compensates for, for each transmission path, deviation containing amplitude deviation and phase deviation occurring on transmission paths (branches), in case a plurality of signals are transmitted by the plurality of transmission paths in parallel.

A branching part 114a branches signals, which pass through the respective transmission paths, before having deviation occurring therein, and outputs signals Xn(t) ('n' denotes a branch number, and 't' denotes a time) to a pre-deviation signal combining part 111a. The pre-deviation signal combining part 111a combines the signals Xn(t), and generates a first combination signal (reference signal) r(t).

A branching part 114c branches signals which have passed through the respective transmission paths and has deviation occurring therein, and outputs signals Zn(t) to a post-deviation signal combining part 111b. The post-deviation signal combining part 111b combines the signal Zn(t), and generates a second combination signal Y(t). A combining method of the post-deviation signal combining part 111b is the same as the combining method of the pre-deviation signal combining part 111a. A branching part 114b branches signals which pass through the respective transmission paths, and outputs signals Un(t).

A compensation value calculation part 112 calculates, for each transmission path, a correction value Wn(t) for compensating for the deviation, based on the first combination signals r(t), second combination signals Y(t), and branched-off signals Un(t). The signals Un(t) either have or do not have the deviation occurring therein. The compensation part 113 compensates for the deviation on each transmission path dynamically based on the compensation value Wn(t) of each transmission path. At least one of areas R1 through R3 shown in FIG. 4 shows the domain which applies the deviation to the signals, and even in case the area applying the deviation is located anywhere shown in the figure, the deviation can be compensated for according to the present invention.

Operation of the configuration shown in FIG. 4 will now be described. The signals Xn(t) branched off by the branching part 114a and inputted to the pre-deviation signal combining part 111a have not had deviation occurring therein by the respective transmission paths at this time. The pre-deviation signal combining part 111a combines the signals Xn(t) with weights of Vn, and thus generates the signal (reference signal) r(t). The signal r(t) is expressed by the following formula (1):

$$r(t) = \sum_{n=1}^{N} Xn(t) \cdot Vn \qquad (1)$$

where N denotes the number of branching while n denotes the branch number. The signals Zn(t) branched off by the branching part 114c and inputted to the post-deviation signal combining part 111b have received the different deviations by the respective transmission paths.

The post-deviation signal combining part 111b combines the signals Zn (t) with the same weights Vn as those of the pre-deviation signal combining part 111a, and obtains the signal Y(t) expressed by the following formula (2):

$$Y(t) = \sum_{n=1}^{N} Zn(t) \cdot Vn \qquad (2)$$

By using the above-described input signals r(t), Y(t), and Un(t), the correction value calculation part 112 performs calculation as shown in the formulas (3) and (4) below, sequentially, correction weights Wn(t) for deviations on the respective transmission paths are thus obtained, and they are output to the compensation part 113.

$$Wn(t+\Delta t)=Wn(t)+\mu \cdot Un(t)^* \cdot e(t) \qquad (3)$$

$$e(t)=r(t)-Y(t) \qquad (4)$$

where $\mu$ denotes a step size, $\Delta t$ denotes a compensation interval, and Un(t)* denotes the conjugate complex of Un(t).

In the formula (4), e(t) denotes an error signal, and control of the compensation part 113 is made such that this error signal have the value of 'zero'. The correction weights given to the compensation part 113 are output every $\Delta t$. The correction weights have values increased by $\mu \cdot Un(t)^* \cdot e(t)$ from the preceding values, respectively.

The compensation part 113 performs compensation as shown in the following formula (5) using the correction values Wn(t) calculated in sequence as mentioned above.

$$xn(t)=Wn(t) \cdot Pn(t) \qquad (5)$$

where xn(t) denotes a signal transmitted by the n-th transmission path after the deviation is compensated for. Pn (t) denotes a signal input to the compensation part 113 via each transmission path, and, according to the position of the compensation part 113, it may be a signal before having the deviation added thereto, or a signal after having the deviation added thereto.

Figure 4:
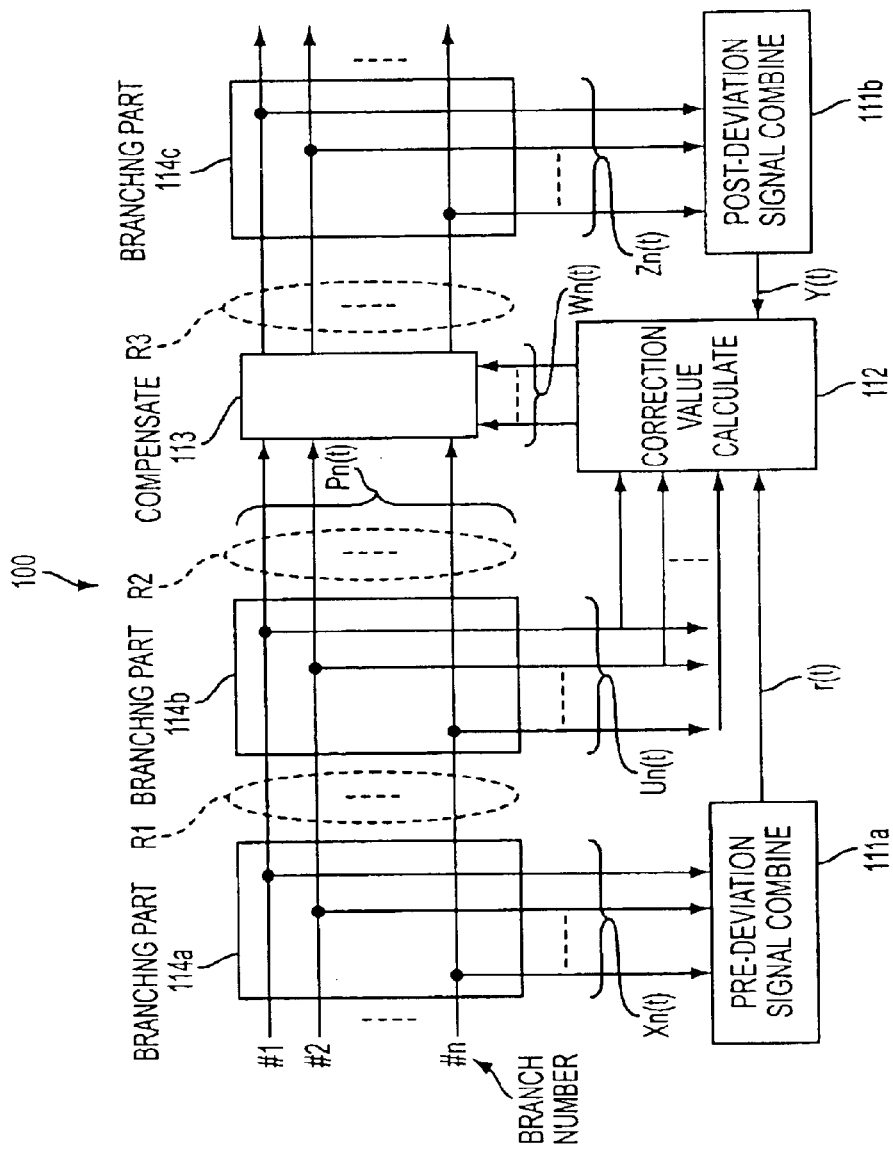
FIG. 4 illustrates a deviation compensation apparatus which does not need known information, according to the present invention.

Thus, the deviation compensation apparatus 100 shown in FIG. 4 (inserted into a base-station apparatus for radio communication, for example, for which amplitude and phase deviations occurring therein should be compensated for, at appropriate locations thereof) updates the correction weights in this way by such an algorithm as to minimize the error e(t) between the first combination signal r(t) of the signals before having deviation added thereto and the second combination signal Y(t) after having deviation added thereto and then the deviations should have been compensated for by the compensating part 113. Application of an MMSE (Minimum Mean square error) method, such as an LMS (Least Mean Squares), is possible as the algorithm therefor.

Moreover, according to the above-described scheme according to the present invention, it is possible to efficiently compensate for dynamically changing deviation real-time without needing known information, which deviation occurs by nonlinear devices such as circuits performing frequency conversion, amplification, etc. provided on the transmission paths, independently for each transmission path due to difference in particular products of the devices such as manufacturing error, aging, temperature characteristic, etc.

However, in the configuration shown in FIG. 4 according to the present invention, processing is performed on each array antenna. Accordingly, due to restrictions concerning layout in hardware, space, etc., circuit configuration may become complicated in case compensation processing should be made for each functional block individually.

Then, a configuration of deviation compensation apparatus according to the present invention which can flexibly cope with restrictions in hardware even in case processing of respective branches is divided into a plurality of blocks will now be described.

Figure 5A:
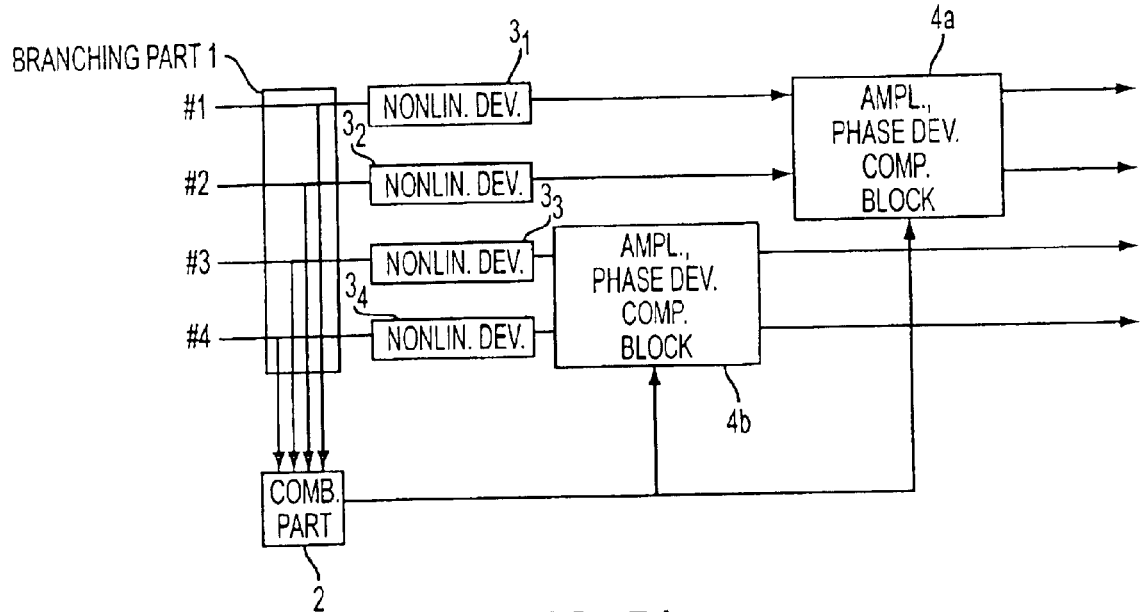
FIGS. 5A and 5B illustrate a first principle configuration of a deviation compensation apparatus which can be flexibly adapted to restrictions in hardware even when processing on respective branches is divided, according to the present invention.

FIG. 5A is a principle diagram thereof, and, it is assumed that the signal on each transmission path is transmitted to the right from the left in the figure. Furthermore, although four transmission paths are shown in the figure, the present invention is not limited to such a configuration having four transmission paths.

In the figure, a branching part 1 branches signals Xn(t) passing through the respective transmission paths before having amplitude and phase deviation applied thereto. A combining part 2 combines the thus-branched-off signals by an arbitrary method. Nonlinear devices such as frequency converters or the like $3_1$ through $3_4$ generate deviations independently for the respective branches to be compensated for by the present invention. Amplitude and phase deviation compensation blocks 4a and 4b are provided for compensating on the signals passing through the respective transmission paths after the amplitude and phase deviations applied thereto. These deviation compensation blocks 4a and 4b have the reference signals r(t) and signals on the respective transmission paths input thereto, compensate on these signals for the amplitude and phase deviations by an adaptive algorithm such as MMSE.

In the figure, the amplitude and phase deviation compensation block 4a is in charge of a combination of the signals passing through the transmission paths on branched 1 and 2, while the amplitude and phase deviation compensation block 4b is in charge of a combination of the signals passing through the transmission paths on branches 3 and 4. However, according to the present invention, any other combinations may also be applied, and, also, any number of amplitude and phase compensation blocks may be used.

Figure 5B:
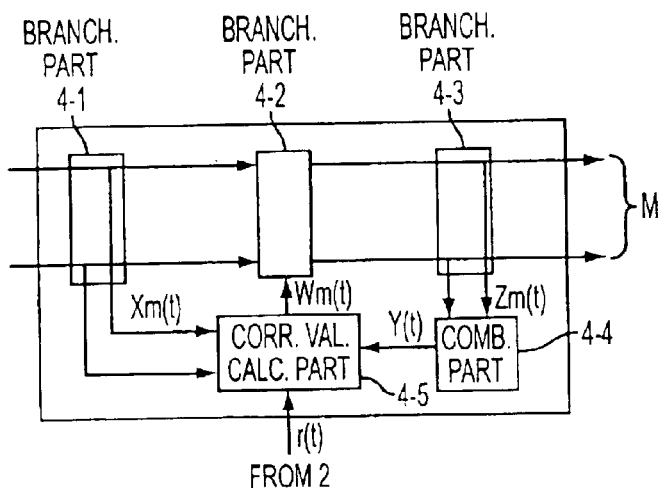

FIG. 5B shows a configuration of each of the amplitude and the phase deviation compensation blocks 4a and 4b in detail.

In the amplitude and phase deviation compensation block shown in the figure, a branch part 4-1 branches the signals Xm(t) on the relevant transmission paths, a compensation part 4-2 is provided for the relevant transmission paths, a branching part 4-3 branches signals Zm(t) on the relevant transmission paths already compensated for the deviation thereof, a combining part 4-4 combines, by an arbitrary method, the signals given by the branching part 4-3, and a correction value calculating part 4-5 calculates correction values Wm(t) for the respective transmission paths for compensating for the relevant deviations based on the signals given by the branching part 4-1, combining part 2 and the combining part 4-4. The compensation part 4-2 compensates for the relevant deviations generated by the nonlinear devices 3 by using the thus-obtained correction values Wm(t) on the respective transmission paths.

The principle thereof will now be described in detail. The signals Xn(t) branched off by the branching part 1 do not have deviations added thereto yet. Accordingly, the combination signal r(t) obtained through combination by the combining part 2 with the weights Vn can be expressed by the following formula, similar to the combination signal obtained by the above-mentioned pre-deviation signal combining part 111a shown in FIG. 4:

$$r(t)=V1X1(t)+V2X2(t)+V3X3(t)+V4X4(t)$$

assuming that N=4, as shown in FIG. 5A. However, in the following description, it is assumed not as N=4 but as N.

The signals Xn(t) which pass through the nonlinear elements 3 receive deviations which are different for the respective transmission paths, and are inputted into the amplitude and the phase deviation compensation blocks 4a and 4b. There, as shown in FIG. 5B in detail, the correction value calculating part 4-5 every time updates the correction weights Wm(t) by using the reference signal r(t) from the combining part 2, signals Xm(t) on the relevant transmission paths, and the combination signal of the compensated signals Zm(t) on the relevant transmission paths.

As the combining part 2 uses the weights Vm same as those on the corresponding combination of the transmission paths used by the combining part 4-4, the combination weights used by the combining part 4-4 is such that:

$$Y(t) = \sum_{m=1}^{M} Zm(t) \cdot Vm \quad (6)$$

where:

M denotes the number of branches on the relevant combination of the transmission paths (the number of branches of transmission paths on which the deviation is compensated for, and '2' in this example); and m denotes the branch number on the relevant combination of the transmission paths (the number of the branch of the transmission path on which the deviation is compensated for).

The correction value calculating part 4-5 performs the following calculation shown in the formula (7) every time, and outputs the correction weights Wm for compensating for the deviations on the respective transmission paths to the compensation part 4-2.

$$Wm(L+1) = Wm(L) + \mu \cdot \frac{1}{p} \sum_{t=1}^{p} \left[ \frac{e(t) \cdot Xm(t)*}{\sum_{m=1}^{M} |Xm(t)|^2} \right] \quad (7)$$

$$e(t)=r(t)-Y(t) \quad (8)$$

where:

L indicates the L-th calculation, and Wm(L) denotes the correction value thereon, and, similarly, Wm(L+1) denotes the correction value obtained on the calculation subsequent to the L-th calculation;

Xm(t) denotes the signal on the m-th branch number;

$\mu$ denotes a step constant; and p denotes an averaging processing span (corresponding to averaging for a predetermined number of samples).

The compensation part 4-2 performs correction/compensation operation by using the correction values Wm(L) calculated every time as mentioned above, according to the following formula (9):

$$xm=Wm(t) \cdot Pm(t) \quad (9)$$

where:

xm(t) denotes the signal transmitted by the m-th transmission path after the deviation thereof is compensated for; and Pm(t) denotes the signal to be input to the compensation part 4-2 to be compensated for.

Thus, in the configuration according to the present invention, in order to solve the problem on the related art, a signal irreverent to relevant combination of transmission paths is permitted to be mixed into the reference signal. That is, in order to simplify the configuration, the reference signal r(t) is calculated based on the above-mentioned formula (1). The reference signal r(t) combined according to the formula (1) includes a signal irreverent to the transmission paths to be compensated (transmission paths of 1 through m). Also, the signal irreverent to the transmission paths to be compensated is included in the error signal e(t) as can be seen from the formula (8).

However, in the formula (7), the error signal e(t) is multiplied by the signal relevant to the transmission path to be compensated, and also, average thereof is calculated for the predetermined time interval. At this time, as the signal relevant to the transmission path to be compensated and the signal irrelevant to the transmission path to be compensated have no correlation, the average of the product thereof becomes approximately zero as the above-mentioned predetermined time interval is set longer. As a result, in the formula (7), the signal irreverent to the transmission paths to be compensated becomes negligible for a practical use.

Although NLMS (Normalized Least Mean Square) method is applied in the above-mentioned formula (7), any other algorithm may be applied as long as it can provide a similar function, according to the present invention.

Figure 6A:
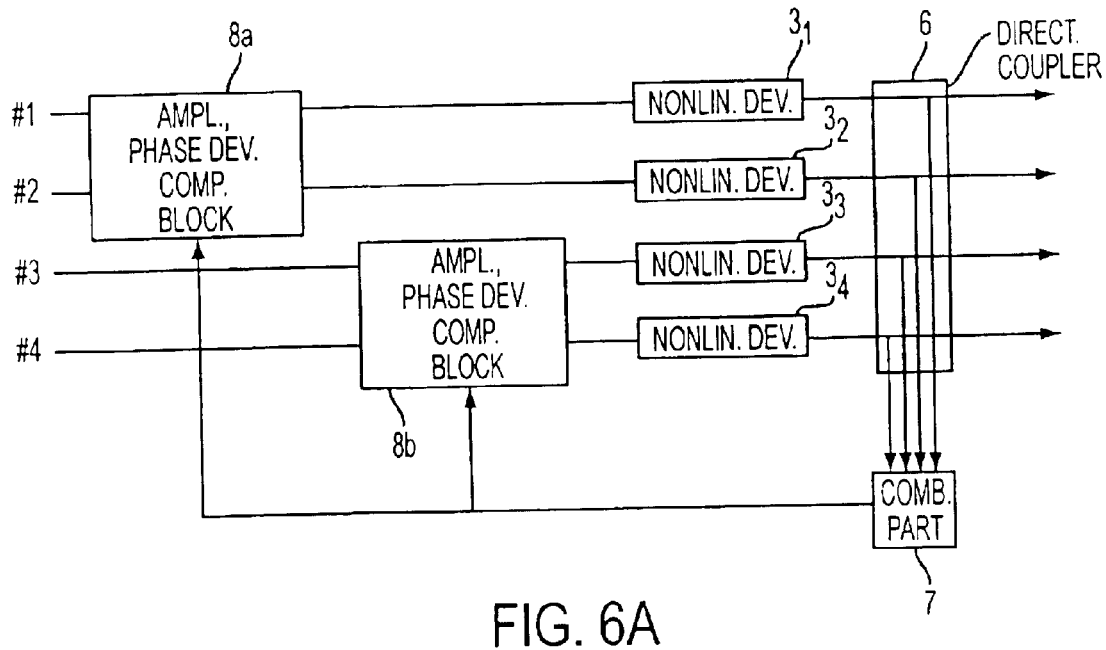
FIGS. 6A and 6B illustrate a second principle configuration of a deviation compensation apparatus which can be flexibly adapted to restrictions in hardware even when processing on respective branches is divided, according to the present invention.
Figure 6B:
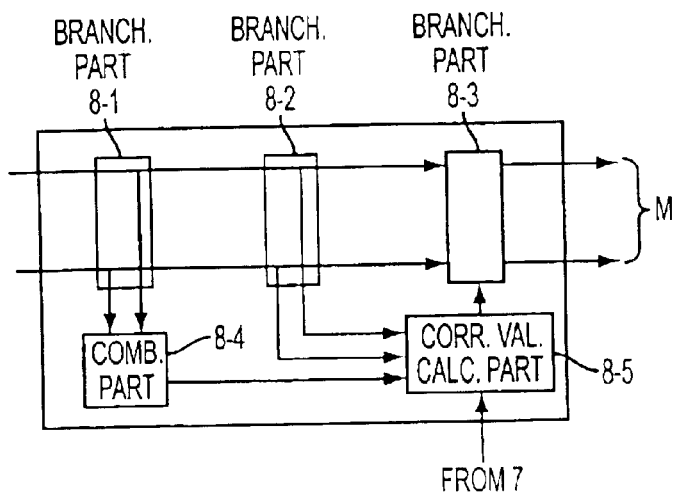

FIG. 6A shows another principle diagram in which flows of signals are reverse to those shown FIG. 5A. Different from the configuration on FIG. 5A, compensation/correction is made at a position before the signals have deviations added thereto. Other than this matter, the FIGS. 6A and 6B are the same as FIGS. 5A and 5B, and description thereof is omitted.

Figure 7A:
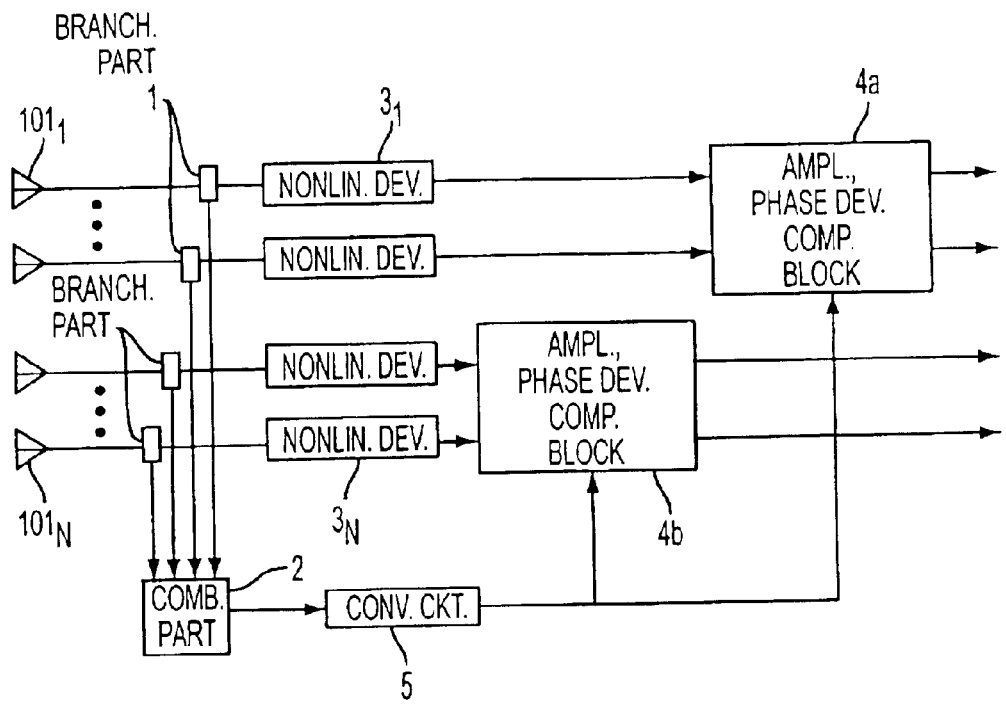
FIGS. 7A and 7B illustrate an up-link (reception system) array antenna system incorporating an amplitude and phase deviation compensation apparatus according to a first embodiment of the present invention illustrated in FIGS. 5A and 5B.

FIG. 7A shows a configuration of one embodiment of the present invention, which is an up-link (reception system) array antenna system.

The same reference numerals are given to the same parts/components as those shown in FIG. 5A. The signals received by respective antennas $101_1$ through $101_N$ are converted into digital signals of baseband through amplification, frequency conversion, demodulation, AD conversion, etc. by means of nonlinear devices $3_1$ through $3_N$. In this process, the signals on respective antenna branches (transmission paths) have deviations added thereto independently by the nonlinear devices $3_1$ through $3_N$, and these deviations may change dynamically according to change in input levels and elapse of time, and thus should be compensated at a real-time basis.

Signals branched off by a branching part 1 are combined by a combining part 2 (pre-deviation signal combining part), and, since the thus-obtained combination signal is a combination of the signals before having the deviations added thereto by the nonlinear devices $3_1$ through $3_N$, it can be used as a reference signal for adaptive processing performed by signal amplitude and phase compensation blocks 4a and 4b (which may be divided into an arbitrary number of blocks). In this case, as the combination signal is an RF signal, it is converted into a digital signal through amplification, frequency conversion, demodulation, A-D conversion, etc. by a circuit 5 having the same functions as those of the nonlinear devices $3_1$ through $3_N$. The signal amplitude and the phase deviation compensation blocks 4a and 4b include a plurality blocks so as to cope with given restrictions on hardware etc. of an apparatus (for example, a base-station apparatus used for radio communication) into which the deviation compensation apparatus according to the present invention is inserted for compensating for deviations occurring therein as mentioned above.

Figure 7B:
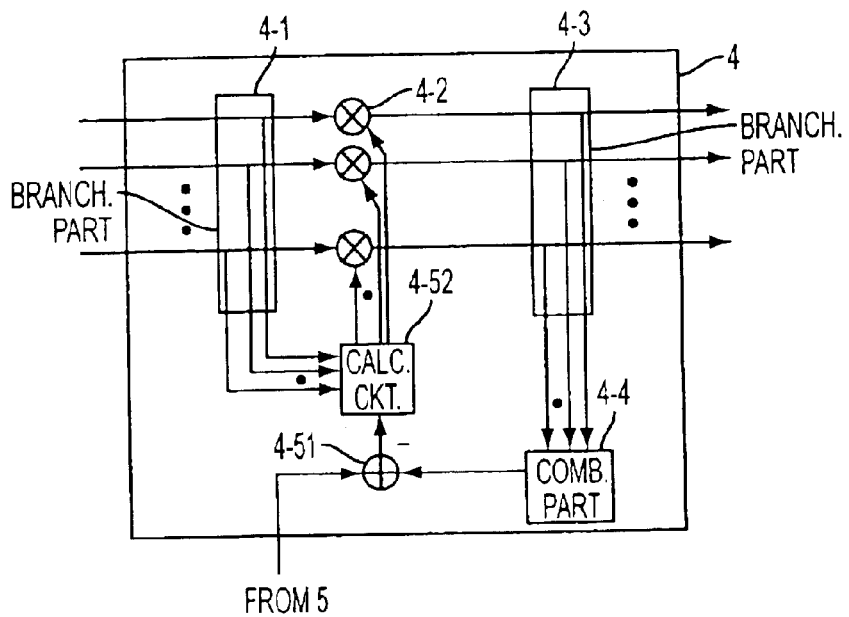

In the signal amplitude and phase deviation compensation block 4 (4a or 4b), as shown in FIG. 7B, respective branch signals branched off by a branching part 4-1, a combination signal obtained through combination by a combining part 4-4 of branch signals branched off by a branching part 4-3, and an output signal of the circuit 5 are used, and, correction weights are updated by the formula (7) mentioned above by an error signal generating circuit 4-51 and a calculating circuit 4-52. The thus-calculated correction weights are input to a compensation part 4-2, and thereby, compensation/correction is performed by a multiplier provided for each branch, according to the above-mentioned formula (9).

Figure 8A:
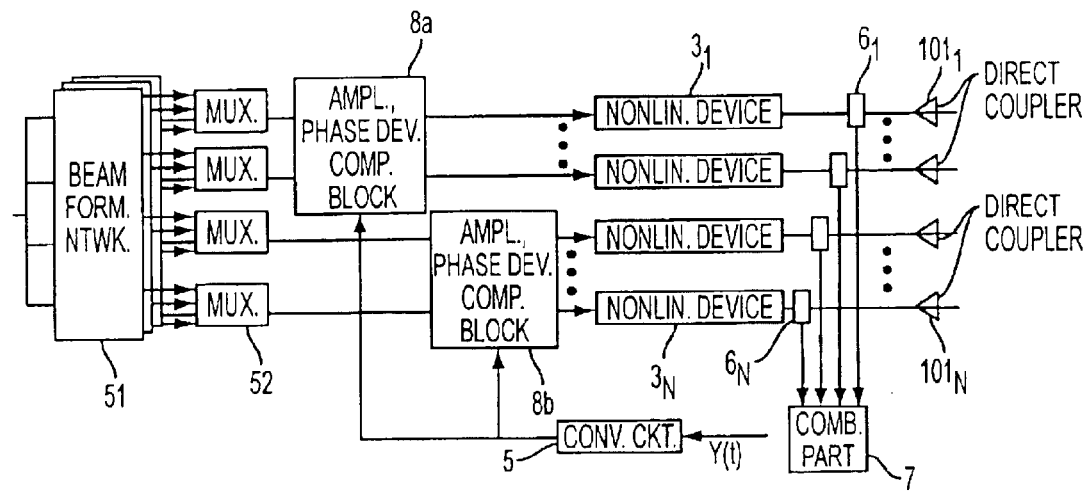
FIGS. 8A and 8B illustrate a down-link (transmission system) array antenna system incorporating an amplitude and phase deviation compensation apparatus according to a second embodiment of the present invention illustrated in FIGS. 6A and 6B.

FIG. 8A shows another embodiment of the present invention, which is a down-link (transmission system) array antenna system incorporating an amplitude and phase deviation compensation circuit according to the present invention. The same reference numerals are given to the same parts/components as those shown in FIG. 6A.

This system includes, as shown in the figure, beam forming networks 51, and, one beam forming network 51 is used for one user. Accordingly, the number of beam forming networks 51 is at least equal to the number of circuits for users. Multiplexers 52 such as those for CDMA (Code Division Multiplex Access) for example, are also included.

Each user signal is divided into a number of antenna branches (transmission paths), and the multiplication of weights for beam forming is carried out by the beam forming networks 51. Respective antenna branch signals on respective users thus generated are combined by the multiplex 52 for each antenna branch, and, thus, are multiplexed. The thus-obtained multiplexed signals are transmitted out by the antennas $101_1$ through $101_N$ after undergoing D-A conversion, frequency conversion, and amplification by transmission parts $3_1$ through $3_N$.

In this case, the transmission parts 3 are nonlinear devices, and have deviations independent for the respective antenna branches. These deviations may change dynamically according to the input levels and elapse of time, and, thus, should be compensated at a real-time basis, as mentioned above.

In the present embodiment, the multiplexed signal on each antenna branch has not a deviation added thereto before it is input to the transmission part 3, and is a digital signal so far. Accordingly, in FIG. 8B, a branching part 8-1 branches the signal on each antenna branch, and a combining part 8-4 generates a reference signal r(t) (see the formula (1)) having no amplitude and phase deviations by combining the thus-branched-off signals by a combining method of uniform phase and uniform amplitude, for example.

On the other hand, a signal Y(t) (see the formula (2)) obtained through combination performed by a combining part 7 of respective antenna branch signals branched off by directional couplers $6_1$ through $6_N$ (branching parts) according to the same method as that of the combining part 8-4 on each corresponding combination of transmission paths is a combination signal from the signals having the deviations added thereto by the respective antenna branches (transmission paths). In this case, as it is assumed that frequency conversion is performed by the transmission parts 3, a circuit 5 should converts the given signal into a baseband digital signal for the purpose of comparing the signal with the combination output of the combining part 8-4. Due to restrictions on hardware or the like, amplitude and phase deviation compensation blocks 8a and 8b has a plurality of blocks so as to match the restrictions in hardware of an apparatus on which the deviation compensation should be performed.

Figure 8B:
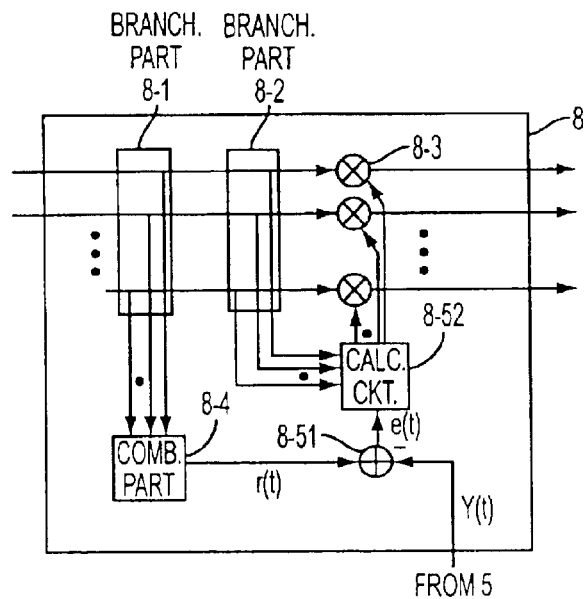

FIG. 8B shows a configuration of each of the amplitude and phase deviation compensation blocks 8a and 8b. As shown in the figure, the respective branch signals branched off by the branching part 8-2 and the combination signal (reference r(t)) obtained through combination performed by the combining part 8-4 of the signals branched off by the branching part 8-1, and the output signal of the circuit 5 are used. Then, an error signal generating part 8-51 and a calculating part 8-52 update the correction weights according to the above-mentioned formula (7). The thus-calculated correction weights are input to the compensation part 8-3, and compensation/correction shown by the formula (9) is performed by a multiplier provided for each branch therein.

Figure 9:
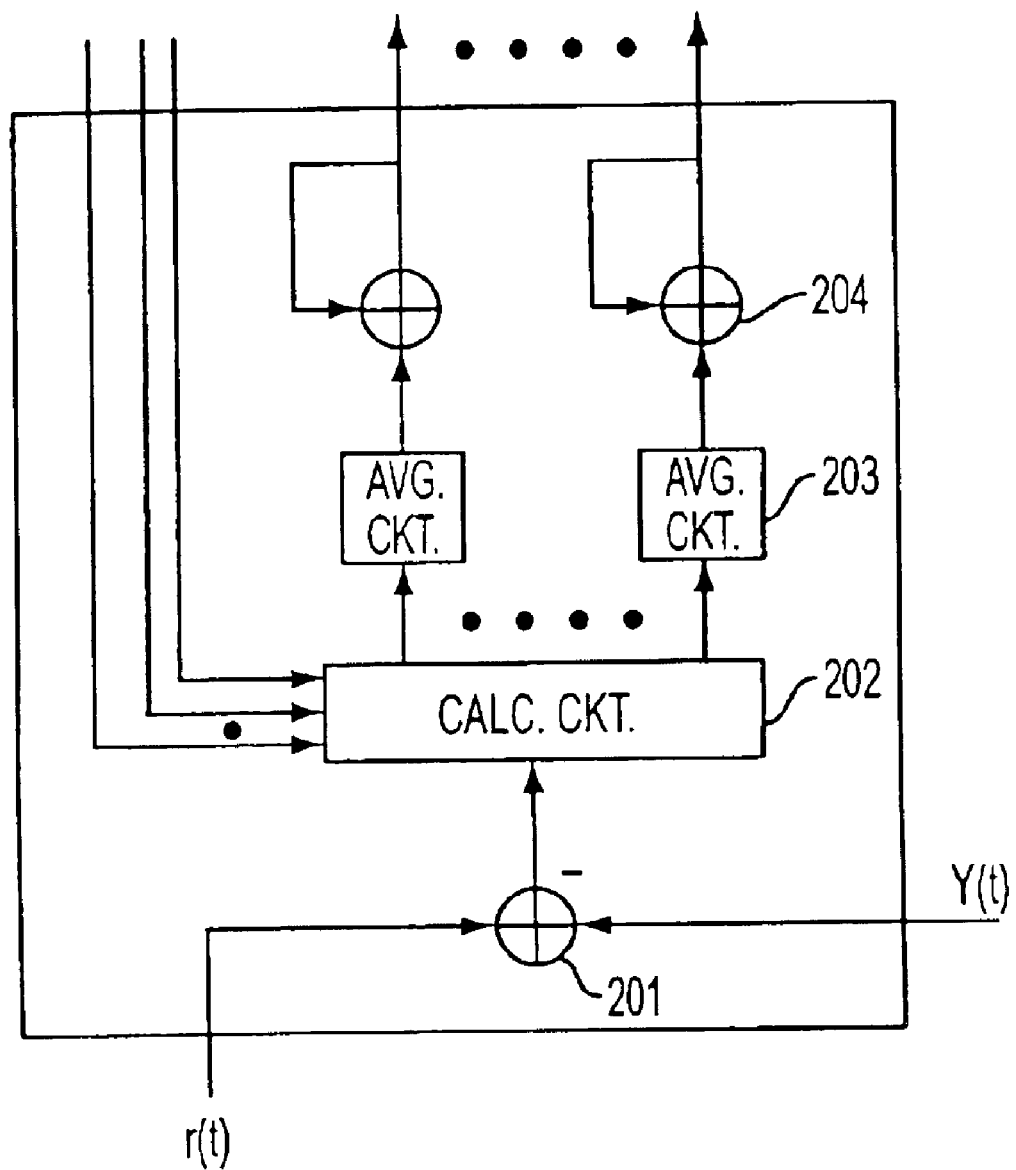
FIG. 9 illustrates a correction value calculating part according to the present invention.

FIG. 9 shows a detail corresponding to the correction value calculating part 4-5 shown in FIG. 5B or the correction value calculating part 8-5 shown in FIG. 6B. In an error signal generating circuit 201, an error e(t) between the reference signal r(t) and the combination signal Y(t) of the respective deviation-added branch signals or respective branch signals added with deviations and then multiplied with correction weights is obtained as shown in the formula (8), and is output to a calculating part 202. The calculating part 202 calculates $\Sigma[\cdot]$ on the second term on the right side of the formula (7), each averaging part 203 obtains the average thereof, and then, multiplies the step constant $\mu$ thereto. Then, each adder 204 adds it to the preceding correction weight, and the thus-obtained correction weights are output to the compensation part 4-2 shown in FIG. 5B or the compensation part 8-3 shown in FIG. 6B.

Thus, according to the present invention, since the component other than the desired signal permitted to be included in the reference signal can be effectively removed, amplitude and phase compensation can be performed properly.

Figure 10:
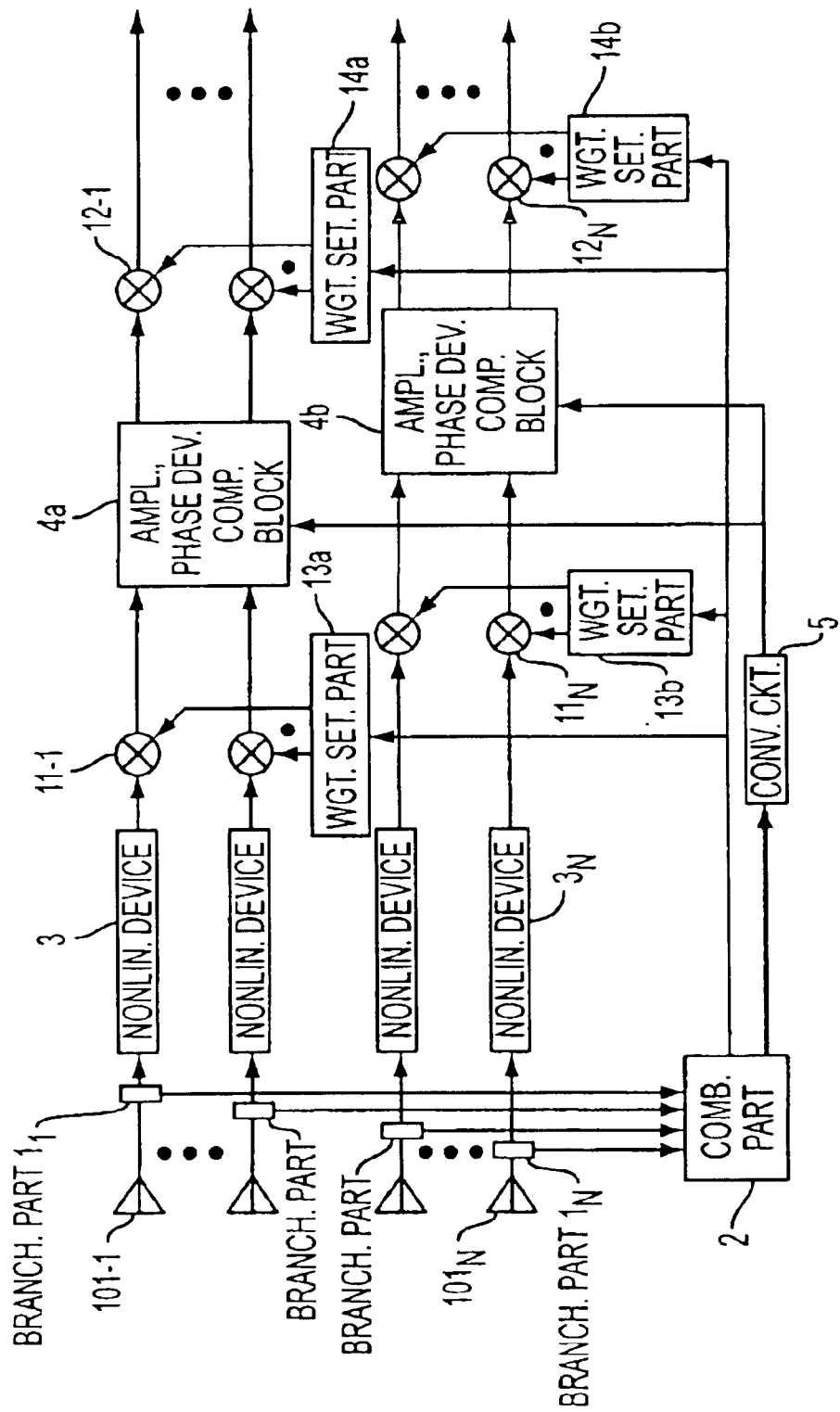
FIG. 10 illustrates another up-link (reception system) array antenna system incorporating an amplitude and phase deviation compensation apparatus according to a third embodiment of the present invention.

FIG. 10 shows another embodiment of the present invention which is an up-link (reception system) antenna array system. The same reference numerals are given to the parts/components same as those shown in FIGS. 7A and 7B. Different from the configuration of FIGS. 7A and 7B, multipliers 11-1, 11-2, ..., 11-N are provided for respective branches, and, thus, circuits of multiplying multiplexed signals on respective branches by amplitude and phase weights of the combination method on the relevant branches used by the combining part 2 are added.

Weight setting parts 13 and 14 obtain information concerning combination weights from the combining part 2, and, sets the weights, same as the amplitude and phase weighs set in the combining part 2, on the relevant branches.

Further, multipliers 12-1 through 12-N perform operations reverse thereto, and, information as to which combining method (combining weights) is applied is sent to the multipliers 11-1 through 11-N and 12-1 through 12-N from the combining part 2.

Thereby, it is possible to flexibly apply a combining method other than a method of uniform phase and uniform amplitude in the combining part 2.

Figure 11:
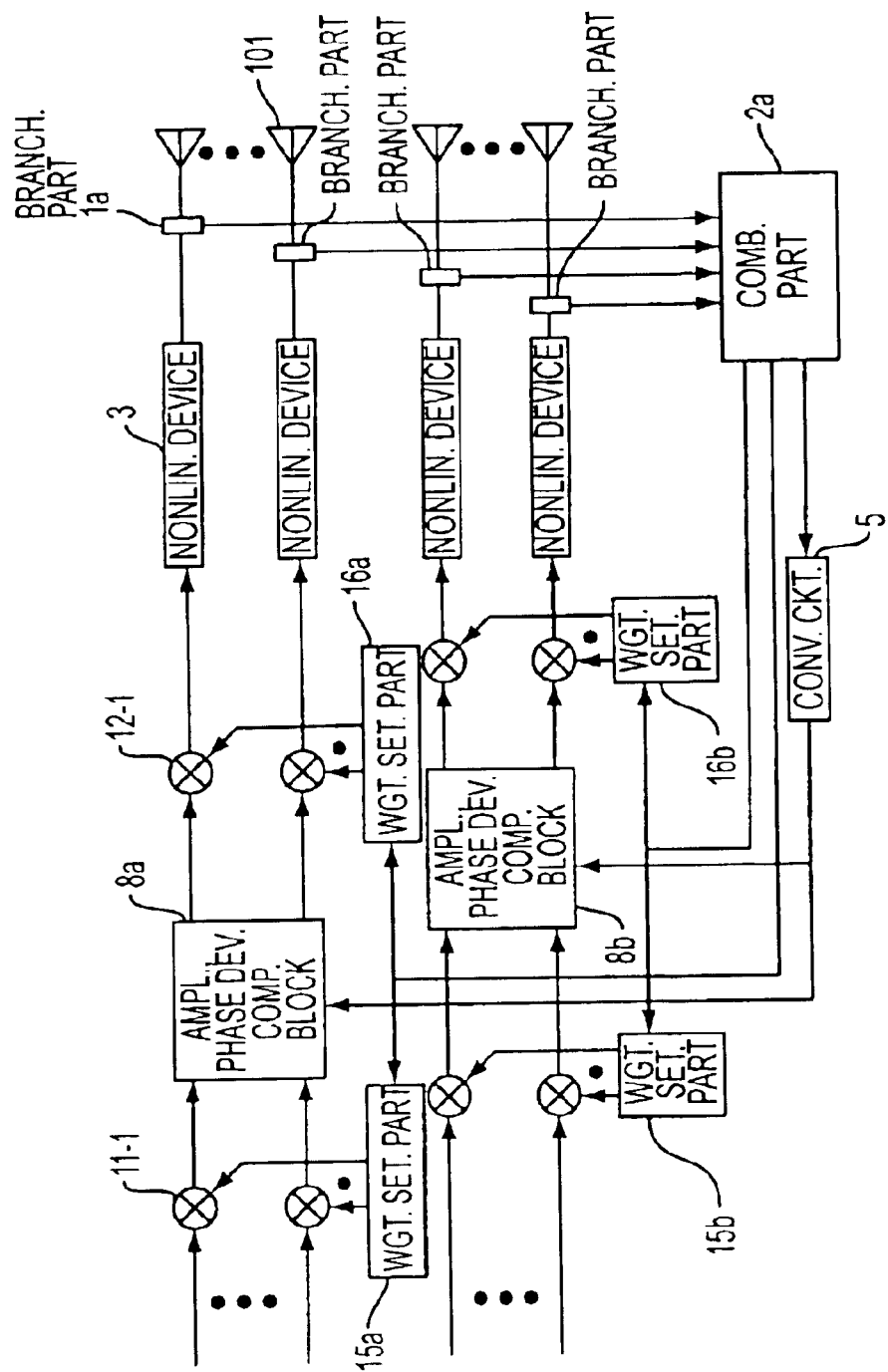
FIG. 11 illustrates another down-link (transmission system) array antenna system incorporating an amplitude and phase deviation compensation apparatus according to a fourth embodiment of the present invention.

FIG. 11 shows a down-link (transmission system) array antenna system incorporating an amplitude and phase deviation compensating part according to the present invention. The same reference numerals are given to the same parts/components as those-shown in FIGS. 8A and 8B. By applying this configuration, also on the down-link system, it is possible to flexibly apply a combining method other than a method of uniform phase and uniform amplitude on each combination of transmission paths. Basically it has the same configuration as that shown in FIG. 10, and description thereof is omitted.

Figure 12:
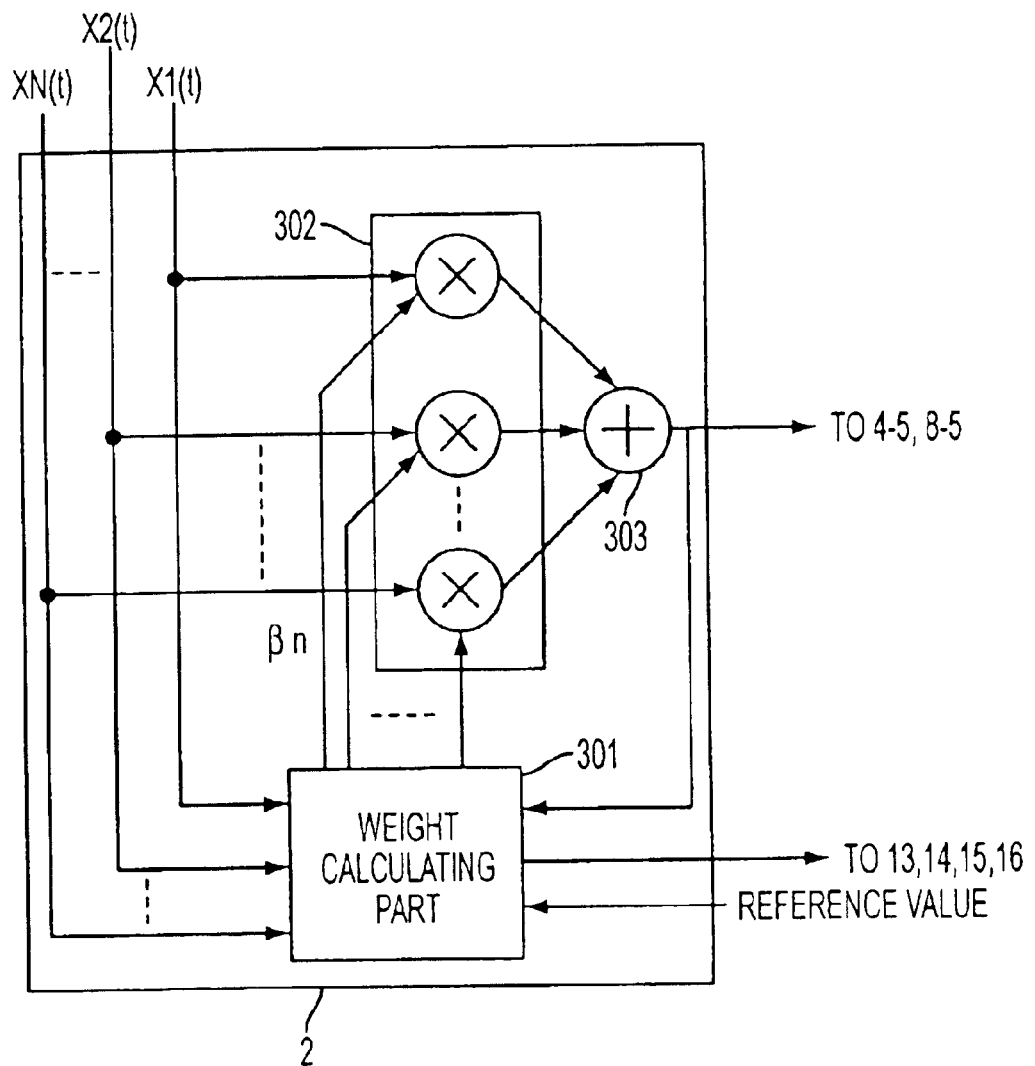
FIG. 12 illustrates a combining part according to the present invention.

FIG. 12 shows an example of the combining part 2 in detail. This combining part 2 includes a weight calculating part 301, a weight multiplying part 302 and an adding part 303.

The weight calculating part 301 calculates the weights such that the combination output of the adding part 303 have a level more than a predetermined level, and, calculates the weights from external information (reference value or the like) and the combination output of the adding part 303. For example, it is assumed that signals X1(t) through XN(t) shown in FIG. 12 are expressed by the following formulas:

$$X1(t)=A1(t)\cdot\exp[j\alpha_1(t)]$$

$$X2(t)=A2(t)\cdot\exp[j\alpha_2(t)]$$

...

...

...

$$XN(t)=AN(t)\cdot\exp[j\alpha_N(t)] \quad (10)$$

where:

A1(t) through AN(t) denote amplitudes on respective transmission paths;

$\alpha_1(t)$ through $\alpha_N(t)$ denote phases on the respective transmission paths; and N denotes the number of branches.

Then, the weight calculating part 301 perform calculation, with respect to X1(t), according to the following formula (11):

$$Y1n(t)=Xn(t)\cdot X1(t)^*=An(t)\cdot A1(t)\cdot\exp[j\alpha_n(t)-j\alpha_1(t)]$$

where n denotes the n-th branch number.

Then, the phase term on the n-th branch is extracted as shown in the following formula (12):

$$\Phi_n(t)=\arg(Y1n(t))=\alpha_n(t)-\alpha_1(t) \quad (12)$$

The weight calculating part 301 uses it, and, according to the following formula (13), it is converted into the phase amount on each transmission path:

$$\beta_n(t)=\exp[-j\Phi_n(t)] \quad (13)$$

Then, this phase rotation is given to each branch, and, according to the following formula (14), combining is performed with weights applied on respective transmission paths:

$$G(t)=\sum_{n=1}^{N} Xn(t)\cdot\beta_n(t) \quad (14)$$

The weight calculating part 301 compares the thus-obtained value G(t) with the given reference value, and, when G(t) is larger than the reference value, the values of $\beta_n$ are used as the combination weights to be output to the weight multiplying part 302.

The information of the thus-obtained combination weights is sent to the weight setting parts 13, 14, 15 and 16, as shown in FIGS. 10 and 11, and, thus, weight setting is performed. The operations performed are reverse between the parts 13, 15 and parts 14, 16.

Figure 13:
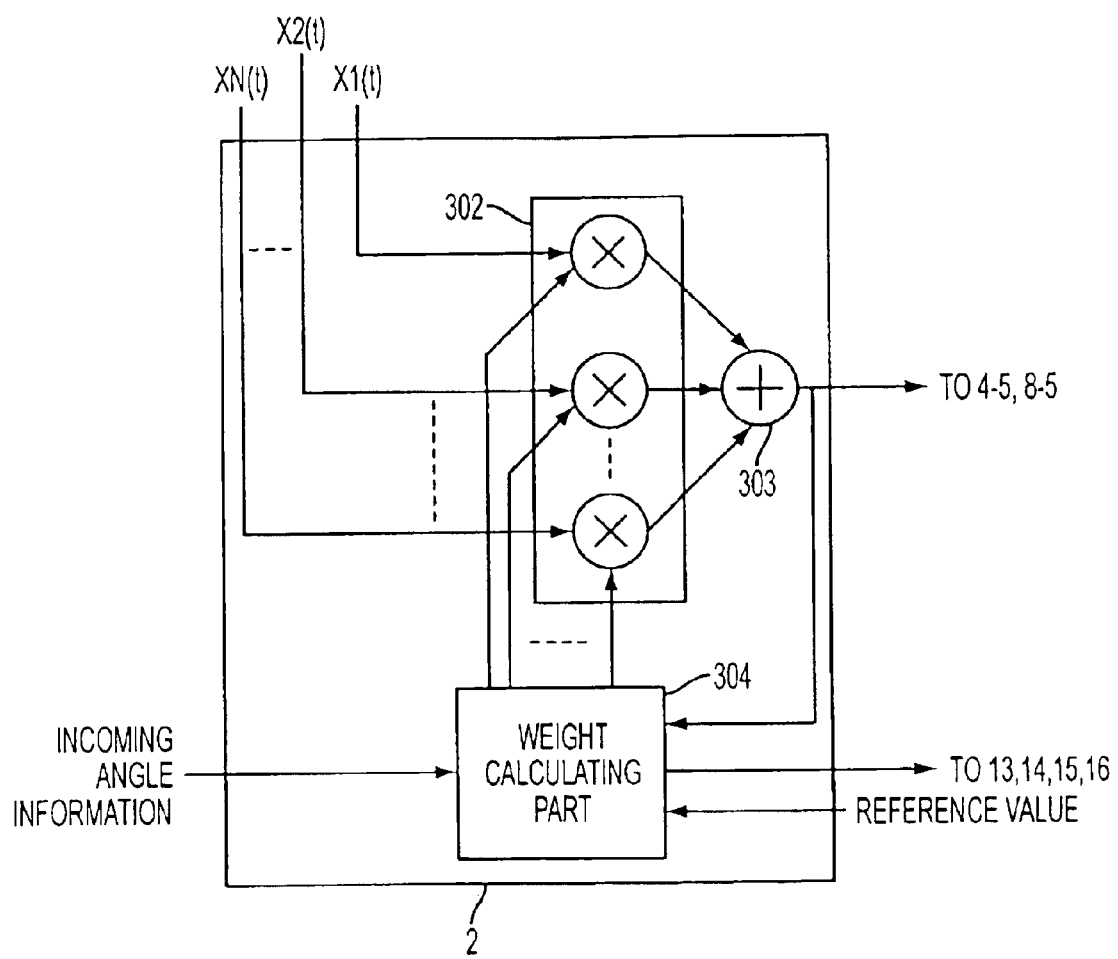
FIG. 13 illustrates another example of the combining part according to the present invention.

FIG. 13 shows an example of a combining part 2 for a case where incoming-direction information is given. The combining part 2 shown in the figure includes a weight calculating part 304, a weight multiplying part 302 and an adding part 303.

The weight calculating part 304 determines weights such that the phase of adjacent branch signals becomes coincident, and sends them to the weight multiplying part 302. The weight multiplying part 302 multiplies the respective branch signals by these weights, and the adding part 303 combines the thus-obtained products. The thus-obtained combined signal is sent to the correction value calculating part 4-5 or correction value calculating part 8-5.

Further, the weight calculating part 304 sends information of the combination weights used there to the weight setting parts 13, 14, 15 and 16, in which the weights are set.

In this case, it is assumed that the incoming direction from which an arbitrary user signal is incident is known. Such a case easily occurs in down-link beam forming. In fact, in general, in order to perform down-link beam forming, the incoming direction is estimated from an up-link user signal, and, weights for down-link beam forming are determined such that the beam is directed to the thus-estimated direction. This directing is known in the base station for down-link communication. The weight calculating part 304 calculates weights W(t) from the information of incoming direction by the following formula (15):

$$W(t)=[1, \exp(-jkd\sin\theta(t)), \exp(-jk2d\sin\theta(t)), \ldots, \exp(-jk(N-1)d\sin\theta(t))] \quad (15)$$

where:

k denotes $2\pi/\lambda$ ($\lambda$ denotes a down-link frequency free space wavelength);

d denotes the antenna interval;

$\theta(t)$ denotes the incoming direction from which an arbitrary user signal is incident; and N denotes the number of antennas.

These combination weights are sent to the weight multiplying part 302 which then multiplies the respective branch signals by these weights, and the thus-obtained products are combined by the adding part 303, and the thus-obtained combination signal is output as the reference signal, as described above. By employing these configurations (FIGS. 12 and 13), the combination output of the combining part 2 or combining part 8-4 is maintained at a high level constantly, and this signal is used for calculating the error signal as mentioned above. Accordingly, it is possible to perform amplitude and phase deviation compensation with high reliability in comparison to a case where a combining method is fixed.

Figure 14A:
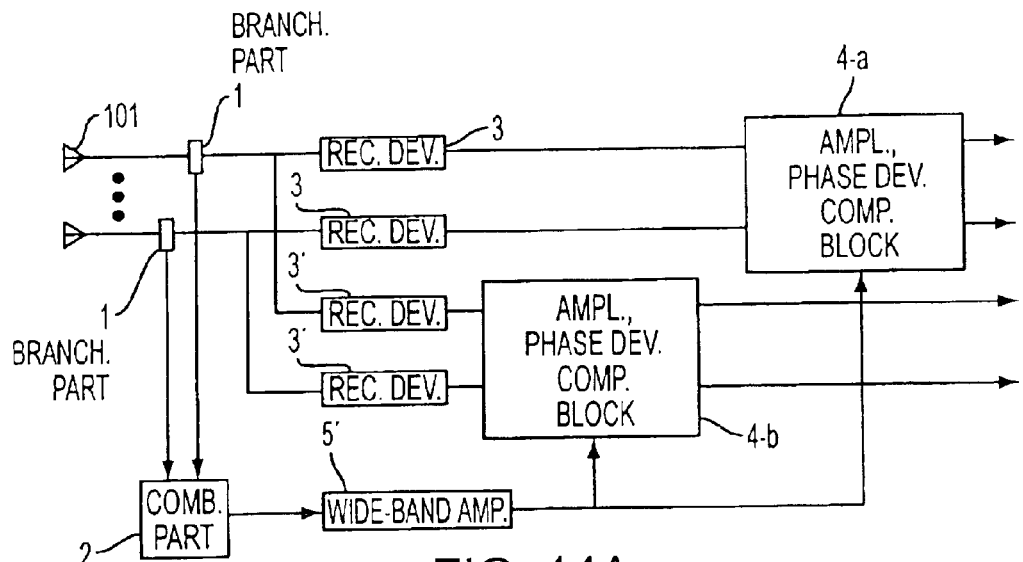
FIGS. 14A and 14B illustrate another example of the up-link (reception system) array antenna system incorporating an amplitude and phase deviation compensation apparatus according a fifth embodiment of the present invention.
Figure 14B:
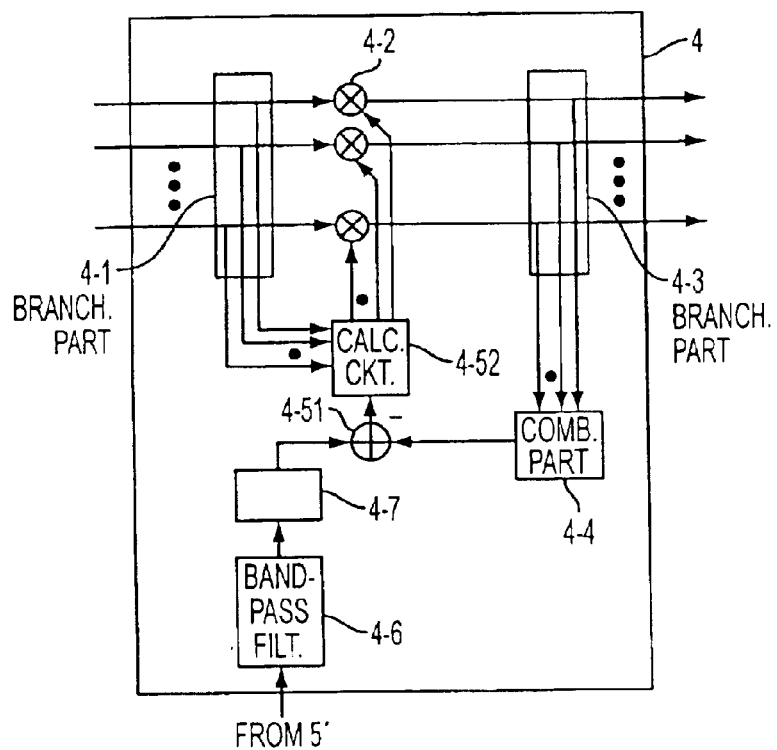

FIGS. 14A and 14B show a configuration in one embodiment of the present invention which is an up-link (reception system) array antenna system incorporating an amplitude and phase deviation compensation circuit according to the present invention. The same reference numerals are given to the same parts/components as those shown in FIGS. 7A and 7B. In FIG. 14A, receiving devices 3 and 3' are those which operate on different carrier frequencies, and use signals received by a common antenna 101.

Although an amplitude and phase deviation compensation system is provided independently for each carrier frequency in a normal configuration, this manner may cause the circuits to become complicated, as a number of RF parts are needed corresponding to the number of carriers. In contrast thereto, according to the present invention, these are made to be a common one so as to simplify the circuit configuration, and, in order to cover the plurality of carrier frequencies, a wide-band amplifier 5' amplifies the signals on the plurality of carrier frequencies simultaneously. Also, as to the amplitude and phase deviation compensation system, as shown in FIG. 14B, a band-pass filter 4-6 selects a desired/relevant carrier frequency signal, and an A-D converter converts the signal into a digital signal. Thus, the amplitude and phase deviation compensation system can be attained by a simple configuration even in case radio communication employs many different carrier frequencies.

Figure 15A:
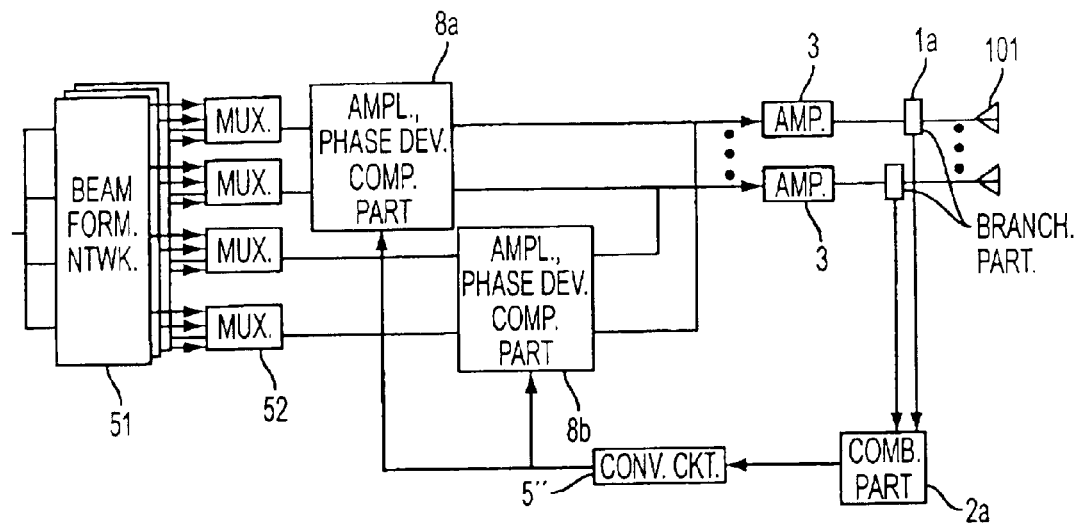
FIGS. 15A and 15B illustrate another example of the down-link (transmission system) array antenna system incorporating an amplitude and phase deviation compensation apparatus according to a sixth embodiment of the present invention.
Figure 15B:
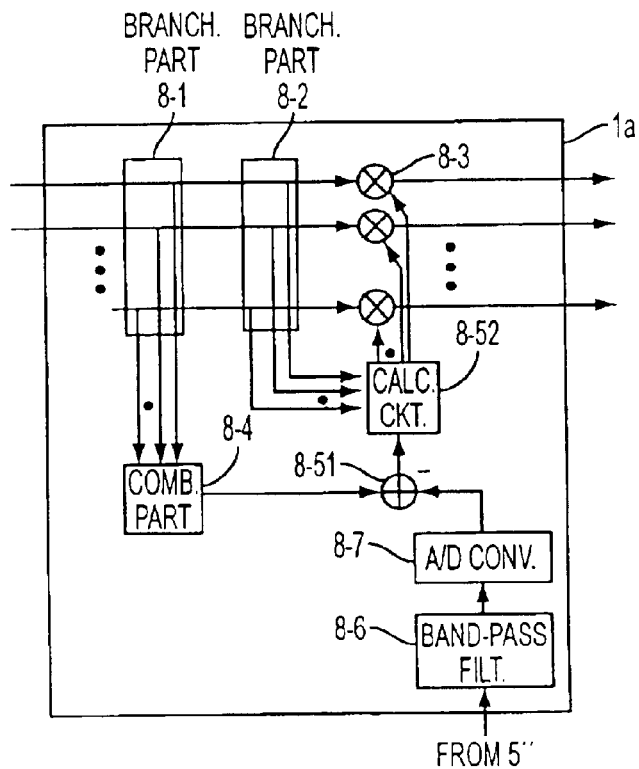

FIGS. 15A and 15B shows a configuration of another embodiment of the present invention, which is a down-link (transmission system) array antenna system incorporating an amplitude and phase deviation compensation circuit. The same reference numerals are given to the same parts/components as those shown in FIGS. 8A and 8B. In FIG. 15A, amplifiers 3 amplify signals on a plurality of carrier frequencies simultaneously, and a common amplifier 5" corresponding thereto is used for the amplitude and phase deviation compensation system. Amplitude and phase deviation compensation blocks 8a and 8b process signals on different carrier frequencies.

Although receiving systems are needed corresponding to the respective carrier frequencies in a normal configuration of amplitude and phase deviation compensation block, a band-pass filter 8-6 selects a desired/relevant carrier frequency signal shown in FIG. 15B, and an A-D converter 8-7 converts it into a digital signal according to the present invention. Thus, the amplitude and phase deviation compensation system can be attained by a simple configuration even in case radio communication employs many different carrier frequencies.

The present invention may be applied to an array antenna system such as a multi-beam antenna system, an adaptive array antenna system or the like, in which a plurality of antenna elements are provided in a radio base station in a cellular mobile communication system, received signals are converted into digital signals, which are then combined with arbitrary amplitude and phase rotations applied thereto, and, thereby, a desired beam pattern is formed.

Further, the present invention is not limited to the above-described embodiments, and variations and modifications may be made without departing from the scope of the present invention.

The present application is based on Japanese priority application No. 2001-076971, filed on Mar. 16, 2001, the entire contents of which are hereby incorporated by reference.

What is claimed is:

1. A deviation compensation apparatus compensating for at least one of an amplitude deviation and a phase deviation occurring in signals during transmission thereof through N transmission paths, where N denotes a natural number larger than 1, comprising;

a compensating part compensating for deviations on M transmission paths of said N transmission paths, where M is a natural number and M<N; and a pre-deviation signal combining part combining signals on the N transmission paths before having the deviations applied thereto, wherein said compensating part performs compensation for the deviations based on output of said pre-deviation signal combining part and the signals on the transmission paths to be compensated.

2. The deviation compensation apparatus as claimed in claim 1, wherein:

said compensating part compensates for the deviations based on the output of said pre-deviation signal combining part, a combination of the signals on the transmission paths to be compensated and the signals on the transmission paths to be compensated after having the deviations applied thereto.

3. The deviation compensation apparatus as claimed in claim 1, further comprising:

a correction value calculating part calculates a correction value every predetermined interval for each transmission path, wherein:

said correction value calculating part performs processing of calculating an average for a second predetermined interval of a product of an error signal of a difference between the output of said pre-deviation signal combining part and a combination of the signals on the transmission paths to be compensated and a signal on the respective transmission path to be compensated.

4. The deviation compensation apparatus as claimed in claim 1, further comprising:

a first circuit of multiplying with an amplitude and a phase rotation, and a second circuit of performing a conversion reverse to that of said first circuit, for at least each transmission path to be compensated.

5. The deviation compensation apparatus as claimed in claim 4, wherein said first circuits apply the same weights as those applied in said pre-deviation signal combining part claimed in claim 9.

6. The deviation compensation apparatus as claimed in claim 1, wherein said pre-deviation signal combining part applies weights in combining the signals such that the combination output may be maintained higher than a predetermined level.

7. The deviation compensation apparatus as claimed in claim 6, wherein the weights are set such that the phases of adjacent transmission paths may be equal.

8. The deviation compensation apparatus as claimed in claim 1, wherein:

said apparatus is used for radio communication employing a plurality of carrier frequencies; and said apparatus further comprises an amplifier covering a frequency band used by the radio communication, a circuit selecting each carrier frequency, and a frequency converting circuit converting each carrier frequency into a baseband frequency.

9. A deviation compensation apparatus compensating for at least one of an amplitude deviation and a phase deviation occurring in signals during transmission thereof through N transmission paths, where N denotes a natural number larger than 1, comprising;

a compensating part compensating for deviations on M transmission paths of said N transmission paths, where M is a natural number and M<N; and a post-deviation signal combining part combining signals on the N transmission paths after having the deviations applied thereto, wherein said compensating part performs compensation for the deviations based on output of said post-deviation signal combining part and the signals on the transmission paths to be compensated.

10. The deviation compensation apparatus as claimed in claim 9, wherein:

said compensating part compensates for the deviations based on the output of said post-deviation signal combining part, a combination of the signals on the transmission paths to be compensated and the signals on the transmission paths to be compensated before having the deviations applied thereto.

11. The deviation compensation apparatus as claimed in claim 9, further comprising:

a correction value calculating part calculates a correction value every predetermined interval for each transmission path, wherein:

said correction value calculating part performs processing of calculating an average for a second predetermined interval of a product of an error signal of a difference between the output of said post-deviation signal combining part and a combination of the signals on the transmission paths to be compensated and a signal on the respective transmission path to be compensated.

12. The deviation compensation apparatus as claimed in claim 9, further comprising:

a first circuit of multiplying with an amplitude and a phase rotation, and a second circuit of performing a conversion reverse to that of said first circuit, for at least each transmission path to be compensated.

13. The deviation compensation apparatus as claimed in claim 12, wherein said first circuits apply the same weights as those applied in said post-deviation signal combining part claimed in claim 10.

14. The deviation compensation apparatus as claimed in claim 9, wherein said post-deviation signal combining part applies weights in combining the signals such that the combination output may be maintained higher than a predetermined level.

15. The deviation compensation apparatus as claimed in claim 14, wherein the weights are set such that the phases of adjacent transmission paths may be equal.

16. The deviation compensation apparatus as claimed in claim 9, wherein:

said apparatus is used for radio communication employing a plurality of carrier frequencies; and said apparatus further comprises an amplifier covering a frequency band used by the radio communication, a circuit selecting each carrier frequency, and a frequency converting circuit converting each carrier frequency into a baseband frequency.

* * * * *

UNITED STATES PATENT AND TRADEMARK OFFICE
CERTIFICATE OF CORRECTION

PATENT NO. : 6,947,718 B2
DATED : September 20, 2005
INVENTOR(S) : S. Kobayakawa It is certified that error appears in the above-identified patent and that said Letters Patent is hereby corrected as shown below:

<u>Title page,</u>
Insert Item:
-- [30]      Foreign Application Priority Data
              March 16, 2001 (JP)................2001-076971 --.

Signed and Sealed this

Thirty-first Day of January, 2006

JON W. DUDAS
*Director of the United States Patent and Trademark Office*